March 13, 1928.                                                                 1,662,738
C. P. COOGLE
SANITARY DEVICE FOR REPELLING MOSQUITOES AND OTHER INSECTS
Filed Sept. 6, 1927
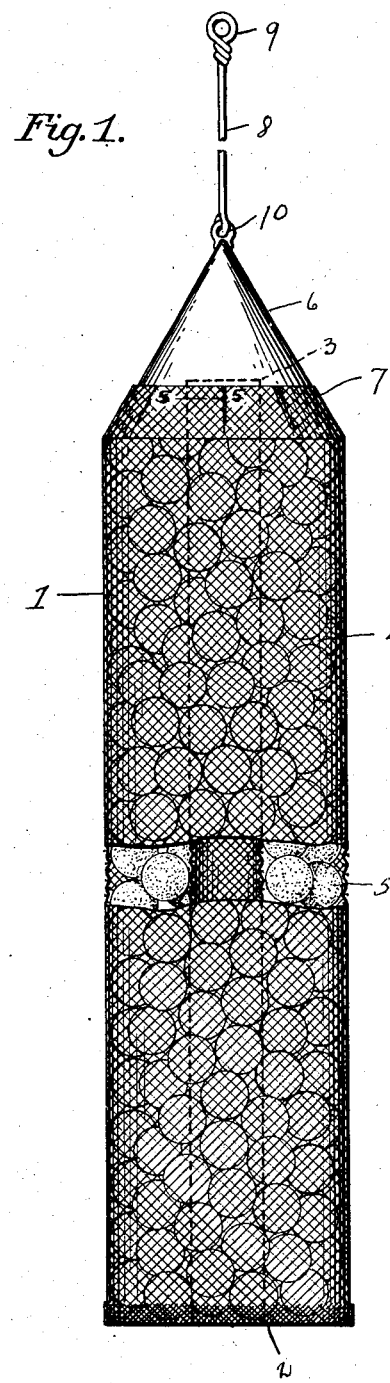
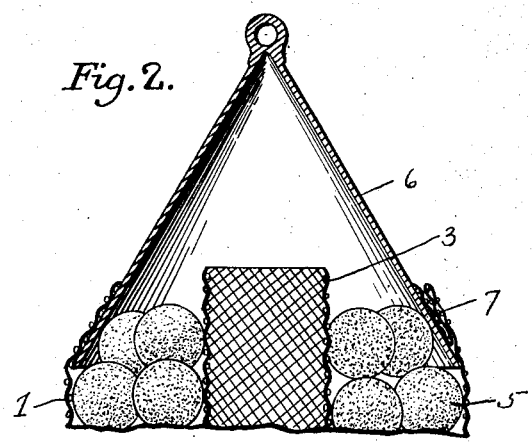
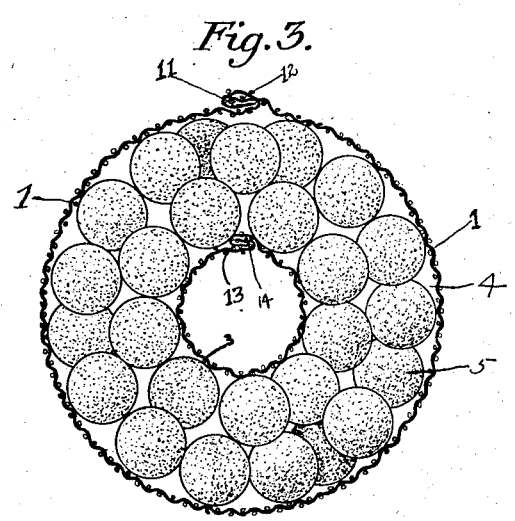
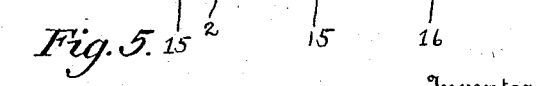
Inventor
Charles P. Coogle,
By J. F. Mahershead
Attorney Patented Mar. 13, 1928.

1,662,738

UNITED STATES PATENT OFFICE.

CHARLES P. COOGLE, OF GREENWOOD, MISSISSIPPI, ASSIGNOR TO UNITED STATES OF AMERICA.

SANITARY DEVICE FOR REPELLING MOSQUITOES AND OTHER INSECTS.

Application filed September 6, 1927. Serial No. 217,818.

(GRANTED UNDER THE PROVISIONS OF THE ACT OF MARCH 3, 1883, 22 STAT. L., 625.)

This application is made under the act of March 3, 1883, chapter 143, 22 Stat., 625, and the invention herein described and claimed, pursuant to the provisions of the aforementioned act reading in part as follows, "may be used by the Government and any of its officers or employees in the prosecution of work for the Government or by any other person in the United States without the payment to him of any royalty thereon."

The present invention relates to an improved sanitary device for the purpose of repelling mosquitoes and other insects and is designed to be hung in chimneys of residences or in windows, closets and other places inhabited by mosquitoes or through which mosquitoes and other insects may gain entrance into homes and other structures.

As is well known to science, certain species of mosquitoes transmit malaria and yellow fever, and all species of this insect are worrisome, to man, and although designed primarily to act as a repellent for mosquitoes the use of this device is by no means confined to reducing the menace and bother occasioned by this insect. It will act as efficiently, depending upon the chemical or substance used therein, in repelling other insect pests, such as flies, fleas, moths, etc.

Investigations by the inventor as a medical officer of the United States Public Health Service, detailed for official duty in rural sanitation demonstrations and studies, especially in the Southern States, have proven that mosquitoes frequently gain entrance to homes, otherwise well screened, through the chimneys thereof. Although the tops of such chimneys can be screened against the entrance of mosquitoes and other insects, it has been found in practice that such screening, covering as it must the entire opening of the chimney, soon becomes clogged, requiring frequent and constant replacement and that such replacement is often neglected and is frequently entirely abandoned because of the clogging effect on the fire draft and because of the trouble caused by the necessity for such frequent attention.

The device in question, however, being smaller than the chimney opening, does not clog the entrance thereof and requires replacement less frequently than would be the case with screening over the top of the chimney, and such replacement, when necessary, can be made with greater ease and this device reloaded with the proper chemical with less expense than screening over the top of the chimney.

With the foregoing and other objects in view, the invention will be more fully described hereinafter, and will be more particularly pointed out in the claims appended hereto, it being understood that I do not desire to be restricted to the use of naphthalene or any other one substance used in connection with this device, nor as describing the advantages of this sanitary device with reference to reducing the menace of the mosquito alone. This device operates equally well when other substances or chemicals are used for the purpose of giving forth odorous emanations disagreeable to all insect life susceptible to objectionable odors.

In the drawings, wherein like symbols refer to like or corresponding parts throughout the several views—

Figure 1 is a side elevation partially broken away of a device constructed according to the present invention.

Figure 2 is a fragmentary vertical section of the upper portion of the device taken on an enlarged scale.

Figure 3 is a cross section through the body of the device also taken on an enlarged scale.

Figure 4 is a fragmentary vertical section of the lower portion of the device taken on an enlarged scale.

Figure 5 is a detail horizontal section taken on the line 5—5 in Figure 1, also on an enlarged scale.

Referring more particularly to the drawings, 1 designates a perforated body, having a perforated bottom 2 affixed thereto at the outer edge of the bottom 2 and at the lower edge of the body 1, a perforated ventilating column 3 is affixed to the bottom 2, forming an annular chamber 4 within the body 1 and around the ventilating column 3. Into the chamber 4 is placed an odorous substance 5, such as naphthalene, naphtha or camphor balls, and an imperforate conical top 6 is affixed in the top of said body 1. The base of the conical top 6 is of substantially the same diameter as the body 1 and is fitted down into the open upper end thereof and held in place by crimping the upper edge of the body 1, as indicated at 7. A wire 8 is affixed to the top of the conical top 6 for suspending said device from the apex of the top by means of the loop 9, said wire being connected to a ring 10 at the apex of the conical top 6.

In constructing this device, I prefer to use ordinary wire mesh screening for the body 1, the bottom 2 and the ventilating column 3, although any perforated material may be used. To form the body 1, a substantially rectangular piece of wire mesh screening is rolled into cylindrical form. One longitudinal edge of this rectangular piece of wire mesh is bent inwardly upon itself and the opposite longitudinal edge is bent outwardly upon itself to form flanges 11 and 12 which interlock and when clinched serve to securely hold the body 1 in cylindrical or other suitable form. The cylindrical ventilating column 3 is formed and clinched in substantially the same manner as the body 1, the flanges formed by bending back in opposite directions of the longitudinal edges thereof being designated 13 and 14.

A circular piece of mesh, slightly larger in diameter than the diameter of the body 1 is cut to form the bottom 2. Onto this bottom 2 is then affixed the ventilating column 3 by intertwining or interlacing the lower ends of the vertical strands of wire 15 of the ventilating column 3 with the mesh of the bottom 2, by bringing said vertical strands of wire 15 down through the mesh of the bottom 2 and bending the same flat against the under side of said bottom 2. This bottom, with ventilating column 3 attached, is affixed to the lower edge of the walls of the body 1 by intertwining or interlacing the vertical strands of wire 16 of the body 1 into and with the mesh of the bottom 2 and bending the edge portion of the bottom 2 which extends beyond the walls of the body 1 up against the outside of the walls of said body 1 and interlacing the wire ends 17 of the bottom 2 into and with the mesh of the body 1. When this bottom 2 is affixed, the ventilating column 3 will lie positioned within the body 1 in a substantially vertical position and extend from the bottom 2, to which it is attached, upwardly approximately the whole height of the body 1 and into the cone top 6, if desired, forming the annular chamber 4 around said ventilating column 3 and inside the body 1. This annular chamber 4 can then be filled with naphthalene, camphor or naphtha balls 5 (commonly called moth balls), or any other odorous substance or chemical disagreeable to the mosquito or other insect. The imperforate conical top 6, the lower edge of which is of substantially the same diameter as the diameter of the body 1 is fitted into the open top end of the body 1, so that its lower edge is in contact with the inner side of the walls of the body 1. That portion of said body 1 extending above the lower edge of the conical top 6 is then crimped upon the outside of the conical top 6 to hold said conical top 6 securely in place and allow the device to be suspended from the apex of the conical top 6. The crimped portion 7 is formed by folding the upper edge of the body 1 upon itself as clearly indicated in Figures 2 and 5, so as to constrict the open end of the body 1 and cause the same to conform to the contour of the conical top. The lower edge of the cone top 6 contacting the inside of the walls of the body 1, as aforesaid, tends to lead rain water entering the chimney and striking this device down the side walls of said body member 1 with a minimum of contact with the substance 5 in the annular chamber 4. Rain water thus conveyed down the walls of this device also tends to wash off soot and other dirt adhering to the sides of the device and thus minimize clogging.

In use this device is hung by the wire 8 from a rod, nail or other suitable support in the chimney, preferably near the bottom thereof. The air of the chimney permeates up and through the substance 5 in the annular chamber 4 and through the ventilating column 3 which envelops a constant column of air. This permeation of air through the device causes a volatilization of the substance 5 with a resultant release of vapors or odorous emanations. The imperforate conical top 6 prevents the escape of the air therethrough which reaches it through the ventilating column 3 and tends to create a back pressure in the column of air constantly filling the ventilating column 3, thus inducing a lateral discharge of the vapors or odorous emanations out of the side of the device through the substance 5 in the annular chamber 4. The draft of the chimney around this device, aided by this back pressure created by the cooperating action of the conical top 6 and the ventilating column 3 induces a ready circulation and distribution of air through the device. This action increases volatilization and consequent vapors which, in ascending the chimney, tend to expand and fill the chimney space.

It will be obvious that many changes in the construction, combination and arrangement of parts could be made which could be used without departing from the spirit of this invention, and I do not mean to limit the invention to such detail except as pointed out in the claims.

Having thus described my invention, what I claim and desire to secure by Letters Patent of the United States is:

1. A sanitary device for repelling mosquitoes comprising a perforated body, a perforated bottom, an imperforate top for said body, and a perforated ventilating column positioned within said body and spaced therefrom so as to provide a chamber within said body for the purpose of receiving chemicals or other odorous substances.

2. A sanitary device for repelling mosquitoes having perforate outer walls and bottom, a ventilating column within said walls and forming a chamber for the reception of a suitable chemical between said column and walls, and an imperforate top having downwardly inclined sides covering said chamber and ventilating column.

3. A sanitary device for repelling mosquitoes and other insects, comprising a cylindrical perforated body, a perforated bottom therefor, an imperforate conical top secured within the top of said body, and a perforated ventilating column attached at its lower end to the bottom of said body and extending upwardly approximately the same height as said body and within the same, so as to provide an annular chamber around said ventilating column and within said body for the reception of odorous chemicals or other substances.

4. A sanitary device for repelling mosquitoes, comprising a perforated body having a perforated bottom, a perforated ventilating column inside said body forming a chamber within said body for the reception of chemicals or other odorous substances, an imperforate conical top secured in the top of said perforated body and cooperating with said ventilating column to force air out through said ventilating column and laterally through the chemical or other odorous substance and said body, and means for suspending the device, substantially as described.

5. A sanitary device for repelling mosquitoes comprising a wire mesh body, a wire mesh bottom for said body of larger diameter than the diameter of said body and having upturned edges engaging the side walls of the body, said body and bottom including end strands of wire interlaced with each other to secure said bottom to said body, a wire mesh ventilating column within said body and spaced therefrom to form an annular chamber for the reception of chemicals or other odorous substance, said ventilating column having vertical wire strands at the bottom thereof passed through and clinched upon the underside of the bottom to affix said ventilating column to said bottom and to hold said ventilating column in substantially vertical position within said body, an imperforate conical top the base of which is of substantially the same diameter as the said body and fitted therein, the upper end of said body being crimped and folded upon said conical top, and means for suspending the device, substantially as described.

CHARLES P. COOGLE.